(12) United States Patent
Rafferty et al.

(10) Patent No.: US 9,965,749 B2
(45) Date of Patent: May 8, 2018

(54) SYSTEMS, METHODS AND APPARATUS FOR VARIABLE SETTLEMENT ACCOUNTS

(71) Applicant: Vantiv, LLC, Cincinnati, OH (US)

(72) Inventors: Thomas E. Rafferty, Cincinnati, OH (US); Bryan T. Bailey, Florence, KY (US)

(73) Assignee: Vantiv, LLC, Symmes Township, OH (US)

( * ) Notice: Subject to any disclaimer, the term of this patent is extended or adjusted under 35 U.S.C. 154(b) by 0 days. days.

(21) Appl. No.: 14/189,060

(22) Filed: Feb. 25, 2014

(65) Prior Publication Data

US 2014/0188712 A1 Jul. 3, 2014

Related U.S. Application Data

(63) Continuation of application No. 13/653,443, filed on Oct. 17, 2012, now Pat. No. 8,700,525.

(51) Int. Cl.
*G06Q 40/00* (2012.01)
*G06Q 20/02* (2012.01)
*G06Q 20/10* (2012.01)
*G06Q 20/22* (2012.01)

(52) U.S. Cl.
CPC .......... *G06Q 20/023* (2013.01); *G06Q 20/10* (2013.01); *G06Q 20/227* (2013.01)

(58) Field of Classification Search
CPC .................................................. G06Q 20/10
USPC ........................ 705/39, 35, 42; 235/379, 380
See application file for complete search history.

(56) References Cited

U.S. PATENT DOCUMENTS

| | | | |
|---|---|---|---|
| 6,327,578 B1 * | 12/2001 | Linehan | 705/65 |
| 7,599,888 B2 * | 10/2009 | Manfre et al. | 705/44 |
| 7,856,399 B2 | 12/2010 | Wilkes | |
| 8,280,809 B2 | 10/2012 | Wilkes | |
| 2003/0115141 A1 * | 6/2003 | Felix et al. | 705/40 |
| 2004/0024700 A1 | 2/2004 | Petigny | |
| 2004/0177037 A1 | 9/2004 | Lee | |
| 2004/0236692 A1 * | 11/2004 | Sellen et al. | 705/45 |
| 2005/0182719 A1 * | 8/2005 | Withrow | 705/40 |
| 2012/0016728 A1 * | 1/2012 | Ahmad et al. | 705/14.23 |
| 2012/0317032 A1 | 12/2012 | Wilkes | |

OTHER PUBLICATIONS

Leemon, Sheldon "QuickBooks Pro 2000: Balance Your Books With Ease.(Software Review)(Evaluation)" Jun. 2000 Computer Shopper , 140.*

Anonymous "Credit card online volumes to fall by one-half by 2009. ( Credit Cards )" Jul. 22, 2006 Cards International , n 363 , p. 9.*

* cited by examiner

*Primary Examiner* — Kelly S Campen
(74) *Attorney, Agent, or Firm* — Bookoff McAndrews, PLLC (57) ABSTRACT

Systems and methods are provided for transferring settlement funds received into a pooled settlement account of an acquirer processor account to one or more financial accounts of a merchant. The transferring of the funds can be directed by one or more settlement rules defined by a merchant. The type of transfer method can be based on the type of financial account. Example types of transfers include Automated Clearing House (ACH) transfers and intrabank transfers.

15 Claims, 6 Drawing Sheets

| END OF DAY BALANCE (POOLED ACCOUNT) | ACCOUNT 1 RULE: $500 EVERY FIVE DAYS | ACCOUNT 2 RULE: $700 MAXIMUM TRANSFER | ACCOUNT 3 RULE: RECEIVE REMAINDER |
|---|---|---|---|
| DAY 1: $1200 | RECEIVE $500 | RECEIVE $700 | RECEIVE $0 |
| DAY 2: $700 | RECEIVE $0 | RECEIVE $700 | RECEIVE $0 |
| DAY 3: $2400 | RECEIVE $0 | RECEIVE $700 | RECEIVE $1700 |
| DAY 4: $600 | RECEIVE $0 | RECEIVE $600 | RECEIVE $0 |
| DAY 5: $1300 | RECEIVE $0 | RECEIVE $700 | RECEIVE $600 |
| DAY 6: $600 | RECEIVE $500 | RECEIVE $100 | RECEIVE $0 |

SYSTEMS, METHODS AND APPARATUS FOR VARIABLE SETTLEMENT ACCOUNTS

CROSS-REFERENCE TO RELATED APPLICATION

This application is a continuation of prior application Ser. No. 13/653,443, filed Oct. 17, 2012, titled "SYSTEMS, METHODS AND APPARATUS FOR VARIABLE SETTLEMENT ACCOUNTS," the content of which is incorporated herein by reference.

TECHNICAL FIELD

This application relates generally to financial transaction processing, and more particularly, to merchant account settlement.

BACKGROUND

Financial cards come in a variety of different types from traditional credit cards and debit cards to stored value cards. Acquirer processors maintain relationships with merchants that enable the merchants to accept financial cards from cardholders. The ability to accept cards as payment generally requires the merchant to have a merchant account with an acquiring financial institution. Obtaining a merchant account and becoming a merchant also generally requires the business to have a settlement account at a financial institution where funds can be deposited. The settlement account is typically accessible to the acquirer processor through the use of the automated clearing house (ACH) network.

SUMMARY

In accordance with one embodiment, a computer-based funds settlement method, comprises receiving, from a computing device associated with a merchant, account identifying information for each of a first financial account and a second financial account. The method also comprises receiving, from the computing device associated with the merchant, one or more settlement rules, where the one or more settlement rules each provide directives for settling funds to at least one of the first and second financial accounts. The method also comprises storing the one or more settlement rules in an electronic database and receiving, into a pooled account, an electronic transfer of funds on behalf of the merchant. The method also comprises electronically transferring, based on at least one of the one or more settlement rules, a first portion of the funds from the pooled account to the first financial account, and electronically transferring, based on at least one of the one or more settlement rules, a second portion of the funds from the pooled account to the second financial account.

In accordance with another embodiment, an electronic funds settlement system comprises an acquirer processor in electrical communication with a point of sale device of a merchant and a payment network, the acquirer processor configured to process financial transactions initiated at the point of sale device and subsequently receive electronic funds from the payment network. The acquirer processor comprises an electronic rules database configured to store settlement rules defined by the merchant, and a settlement engine in communication with the electronic rules database, the settlement engine configured to periodically electronically transfer portions of the electronic funds to each of a plurality of financial accounts, where the portions transferred are based on one or more of the settlement rules stored in the electronic rules database.

In accordance with another embodiment, a non-transitory computer readable medium having instructions stored thereon which when executed by a processor cause the processor to receive from a merchant an identification of a first settlement account, an identification of a second settlement account, and a settlement rule. The instructions also cause the processor to receive transaction information from a point-of-sale device associated with the merchant and based on the transaction information, receive electronic funds into an account on behalf of the merchant. The instructions also cause the processor to, based on the settlement rule, electronically transfer a first portion of the electronic funds to the first settlement account, and based on the settlement rule, electronically transfer a second portion of the electronic funds to the second settlement account.

BRIEF DESCRIPTION OF THE DRAWINGS

It is believed that certain embodiments will be better understood from the following description taken in conjunction with the accompanying drawings in which:

FIG. 3 depicts an example settlement flow of funds from an acquirer processor to three different settlement accounts linked to a merchant.

DETAILED DESCRIPTION

Various non-limiting embodiments of the present disclosure will now be described to provide an overall understanding of the principles of the structure, function, and use of the merchant directed settlement systems and methods disclosed herein. One or more examples of these non-limiting embodiments are illustrated in the accompanying drawings. Those of ordinary skill in the art will understand that the systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

The presently disclosed embodiments are generally directed to systems, methods, and apparatus for settling funds from an acquirer processors' pooled account to one or more settlement accounts of a merchant. In some embodiments, a merchant can link a plurality of settlement accounts to the acquirer processor, which may each be the same or different settlement account types. The type of settlement accounts linked to the acquirer processor can vary by merchant. Example types of settlement accounts include, without limitation, a checking account, a 3rd-party stored value card account, an acquirer-issued stored value card account, a savings account, a peer-to-peer account (such as PAYPAL® account), a virtual wallet account, and so forth. Merchant-specific rules for a variable settlement process can be defined and used by the acquirer processor when settling that merchant's accounts. The directives supplied by the rules can facilitate selective control of the amount of settlement, the settlement account type, the frequency of settlement, or any other suitable settlement feature.

In one embodiment, the merchant can interface with the acquirer processor (sometimes referred to as an "acquirer" or "processor") via an electronically displayed dashboard or other type of application interface. Through this interface, the merchant can link merchant settlement accounts to the acquirer processor and establish any settlement rules associated with the various settlement accounts. The merchant can optionally change, update, or otherwise alter the rules and settlement accounts over time.

While not necessarily within the purview of the acquirer processor, the various merchant settlement accounts can be held by, or otherwise associated with, various types of recipients or other entities, which may or may not be the merchant. For example, in one embodiment, a merchant may link three accounts. A first account is a business checking account held by the merchant's bank in the name of the merchant, a second account is a stored value account that is a prepaid card held by an employee, and a third account is a stored value account that is a prepaid card held by an subcontractor of the merchant. As described in more detail below, the amount of funds transferred, the frequency of the transfer, and any other useful parameters can be determined or otherwise selected by the merchant, the acquirer processor, or any other suitable party.

In accordance with various embodiments, the use of multiple settlement accounts and settlement account types advantageously allows a merchant associated with the acquirer processor to better control and customize the settlement process. The merchant also can have more settlement options with regard to the settlement process. In some instances, funds can be received by the merchant from the acquirer processor faster than is available through typical settlement processes. For example, settlements from an acquirer processor to an acquirer-issued prepaid account using an intrabank transfer can be relatively fast, such as substantially instantaneous. Other transfers of funds during settlement processes described herein, however, may incorporate a delay. These types of transfers may be transfers utilizing the traditional ACH transfer channels. Nevertheless, even though there may be a delay associated with such settlement transactions, the merchant can still beneficially direct such settlements to one or more predefined settlement accounts in accordance with the merchant's directives.

Figure 1:
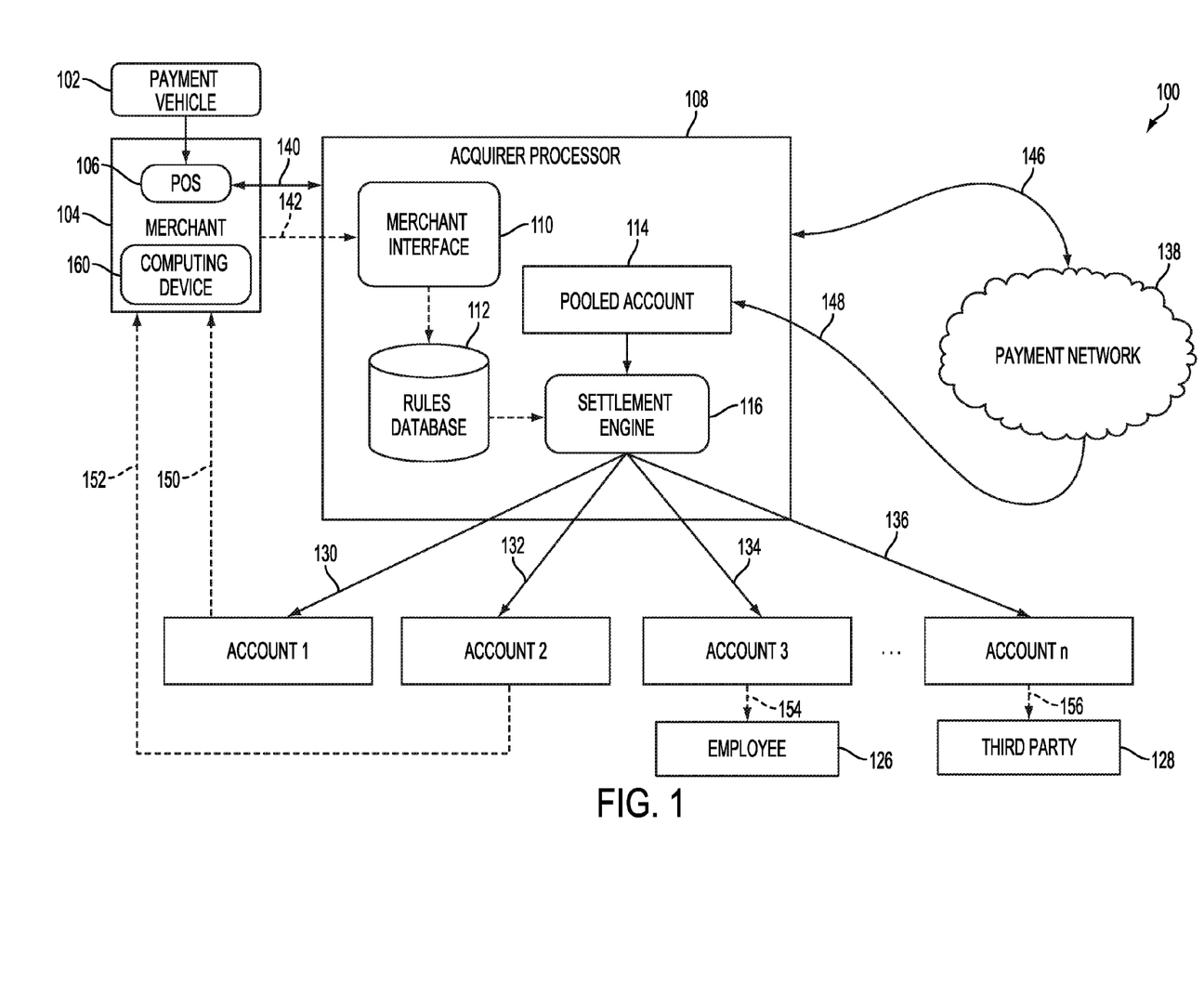
FIG. 1 depicts a transaction and settlement system in accordance with one example embodiment.

FIG. 1 shows a transaction and settlement system 100 in accordance with one example embodiment. An acquirer processor 108 is configured to communicate with a merchant 104, which is associated with a point of sale (POS) device 106. The merchant 104 can be any suitable merchant type, such as an e-commerce merchant or a brick-and-mortar merchant. It follows that the POS device 106 can be any suitable type of device or system capable of receiving information from a payment vehicle 102, including physical card readers, e-commerce, web-based POS devices, and mobile payment devices. The presently disclosed systems and methods are not limited to any particular type of payment vehicle. The payment vehicle 102 can be, for example, a credit card, a debit card, an open-loop card, a closed-loop card, a peer-to-peer account, and so forth. As is well known in the art, some transactions can be conducted without presenting a physical transaction vehicle at a point-of-sale. Rather, an account holder can present a predetermined number or alphanumeric combination of letters and numbers associated with one or more accounts to perform a transaction. Further, the payment vehicles can be administered by various companies, such as banks, credit card companies, or other institutions or companies.

During a transaction, upon receiving an authorization communication 140 from the POS device 106, the acquirer processor 108 can communicate with a payment network 138, as shown by payment network communication 146, to seek authorization for the transaction. As is to be appreciated, the payment network 138 can be a debit network, a credit network or a debit and credit network including the MasterCard®/Visa® network or other proprietary networks, such as Plus, Novus (debit), Diner's Club® (credit) and American Express®, the operation and use of which are well known in the art and are, thus, not described herein. The payment network 138 can also include a variety of other entities, such as the issuer bank and issuer processor associated with the payment vehicle 102. In any event, the result of the authorization request can be returned to the acquirer processor 108 by the payment network communication 146. Assuming the authorization request is granted, the transaction at the POS device 106 can be completed. When an authorization request is granted, money is received in the pooled account 114 of the acquirer processes, as denoted by network transaction 148.

In accordance with the systems and methods described herein, the merchant 104 can interact with the acquirer processor 108 to establish, maintain, or otherwise monitor the settlement process. As illustrated, a merchant computing device 160 associated with the merchant 104 can electronically communicate with the acquirer processor 108 through a merchant interface 110. The merchant computing device 160 can be any type of client device suitable for communication over a network, as shown by network communication 142, such as a personal computer, a laptop computer, tablet computer, or a netbook computer, for example. In some example embodiments, merchant computing device 160 is a combination handheld computer and mobile telephone, sometimes referred to as a smart phone. Furthermore, while POS device 106 and merchant computing device 160 are illustrated as separate entities, this disclosure is not so limited. In fact, in some embodiments, the POS device 106 can be configured to interact with the merchant interface 110 to control the settlement process. Also, it is to be appreciated that the merchant computing device 160 broadly refers to any device that is associated with the merchant 104, such as a device under the control of the merchant 104 or an affiliate or agent of the merchant 104, for example. Thus, the computing device 160 shown in FIG. 1 may be a computing device that is not necessarily located within the physical premises of the merchant 104. Instead, the merchant computing device 160 can be a wide variety of device types in a wide variety of physical locations. In any event, the operator of the merchant computer device 160 is able to link settlement accounts to the merchant 104 and establish various settlement rules, as described in more detail below.

In some embodiments, the merchant interface 110 of the acquirer processor 108 includes a web server that can provide a graphical web user interface through which the merchant computing device 160 can interact with the acquirer processor 108. In such implementations, the merchant interface 110 can accept requests, such as HTTP requests, from clients (such as web browsers associated with the computing device 160), and deliver the clients' responses, such as HTTP responses, along with optional data content, such as web pages (e.g., HTML documents) and linked objects (such as images, etc.). In some embodiments, the merchant interface 110 includes an application server that can provide a user interface to the merchant computing device 160 that does not communicate with the acquirer processor 108 using a web browser. Such a merchant computing device 160 can have, for example, special software installed on the merchant computing device 160 that allows it to communicate with the merchant interface 110 via a network. Such software may be downloaded, for example, from the acquirer processor 108, or other software application provider, over a network to such merchant computing devices 160. The software may also be installed on such computing devices 160 by other means known in the art, such as CD-ROM, etc.

Through the merchant interface 110, the merchant 104 can define, control, or otherwise interact with the settlement process. During an account linking process, the merchant 104 can, for example, define a number of different settlement accounts to which the acquirer processor 108 can settle funds (sometimes referred to as linked accounts). Each settlement account can be identified by any suitable technique, such as an account number, routing number, and so forth. As is to be appreciated, any suitable type of financial account may be identified by the merchant 104 during the account linking process. Non-limiting examples of account types that can be linked to the settlement process can include checking accounts, savings accounts, pre-paid open-loop accounts, virtual wallet accounts, peer-to-peer accounts, pre-paid closed-loop accounts, investment accounts, loan accounts, money market accounts, credit union accounts, and so forth. Depending on the type of settlement account being linked, the required information needed by the acquirer processor 108 may differ. For instance, information necessary to link an account associated with a prepaid-type card issued by the acquirer processor 108 may be different than the information necessary to link an account associated with a prepaid-type card issued by a third party. In some embodiments, some accounts linked to a merchant may be a one type of account while other accounts linked to the merchant are of a different type. By way of example, a merchant may link three different checking accounts, two different savings account and one prepaid account.

Through the merchant interface 110, the merchant 104 can also establish various directives (sometimes referred to as rules or settlement rules) that can, at least in part, control the settlement process for that merchant 104. In some embodiments, these rules are stored in a rules database 112. The rules database 112 can be a memory or storage device including, but not limited to random access memory (RAM) such as dynamic RAM (DRAM), static ram (SRAM), flash memory, disk drives, hard drives, redundant array of individual disks or RAID drives, virtual drives, networked drives and memory available using cloud computing. The rules can be merchant-specific to guide the settlement process with regard to that particular merchant. Any suitable type of rule can be established and implemented by the acquirer processor 108. In some embodiments, each linked account is associated with at least one rule. The rules can establish for example, a frequency of settlement for an account, a maximum settlement amount of an account, a type of transfer to be used during settlement, and so forth. The rules can be of any suitable format or structure, such as a relatively simple rule or a more complex nested conditional rule. A settlement engine 116 can settle funds from the pooled account 114 based at least in part on the rules stored in the rules database 112. The settlement engine 116 can be configured, for example, to communicate with the ACH channels or other fund transfer channels required to transfer funds from the pooled account 114 to the linked accounts.

Referring still to FIG. 1, the merchant 104 can link Accounts 1-n, where n is any positive integer, by interacting with the merchant interface 110 though the network communications 142. Each Account 1-n can be of any suitable account type capable of receiving electronically transferred funds during the settlement process. Each Account 1-n can be affiliated with an account holder, which may be the same or different across multiple accounts. As shown in FIG. 1, Account 1 and Account 2 are under the control of the merchant 104, as indicated by the control lines 150, 152. Account 3 is under the control of an employee 126 of the merchant 104, as indicated by the control line 154. Account 3 can be, for example, a prepaid card associated with the employee. In some implementations, the merchant 104 can compensate the employee 126 by settling money from the pooled account 114 to Account 3. Account n is under the control of a third party 128, as indicated by control line 156. The third party 128 can be, for example, a subcontractor, an independent contractor, a service provider, a utility provider, or any other suitable type of entity.

One or more rules associated with the Accounts 1-n are stored in the rules database 112. These rules may have been established by the merchant 104 or may be considered global rules. As is to be readily appreciated, the particular rules for any implementation will be largely based on the types of linked accounts, type of parties controlling the accounts, and the general interests of the merchants and/or the acquirer processor. Merely for the purposes of exposition, example rules associated with FIG. 1 may include the following. A first rule can establish that $500 per week is settled to Account n via settlement event 136. A second rule can establish that a maximum of $200 per transfer is to be settled to Account 3 via settlement event 134. A third rule can establish that $1000 per month is settled to Account 1 via settlement event 130. A fourth rule can establish that the remainder from any settlement event is to be deposited into Account 2 via settlement event 132. As is to be appreciated, the rules established by the merchant 104 can be interrelated or generally independent of each other. Additionally, the acquirer processor 108 can establish rules (sometimes referred to as global rules) for controlling various aspects of the settlement process. For example, the acquirer processor 108 can establish a minimum amount of funds that can be transferred or other settlement parameters.

Portions of the funds can be transferred from the pooled account 114 to the Accounts 1-n by the settlement engine 116 using a variety of transfer techniques. For example, for some linked accounts the automated clearing house (ACH) network can be utilized. Alternatively, funds can be transferred from the pooled account 114 to some Account 1-n using an intrabank transfer. Such types of transfers can be instantaneous, or nearly instantaneous. Thus, in some embodiments, immediately following a card-based transaction, the funds owed to the merchant can be available in an account capable of receiving intrabank transfers. Types of accounts that can receive money via an intrabank transfer include, for example, prepaid accounts for cards that were issued by the acquirer processor 108. The type of transfer used for a particular settlement event can be controlled by the type of account to which the funds are being deposited. Some accounts may be able to receive funds through a variety of different transfer techniques. For these accounts, the rule or rules associated with that account can define the type of transfer to be used. The same type of transfer can be used for every settlement event (such as ACH transfer), or the type of transfer to be used can be based on other factors (such as the amount of transfer). The type of transfer used for a particular settlement event can impact the amount of time it takes for the account holder to have actual access to the funds. Using ACH transfer channels may require up to three days before the account holder has complete access to the funds. On the other hand, settlement events using an intrabank transfer may beneficially allow the account holder relatively immediate access to the transferred funds.

Figure 2:
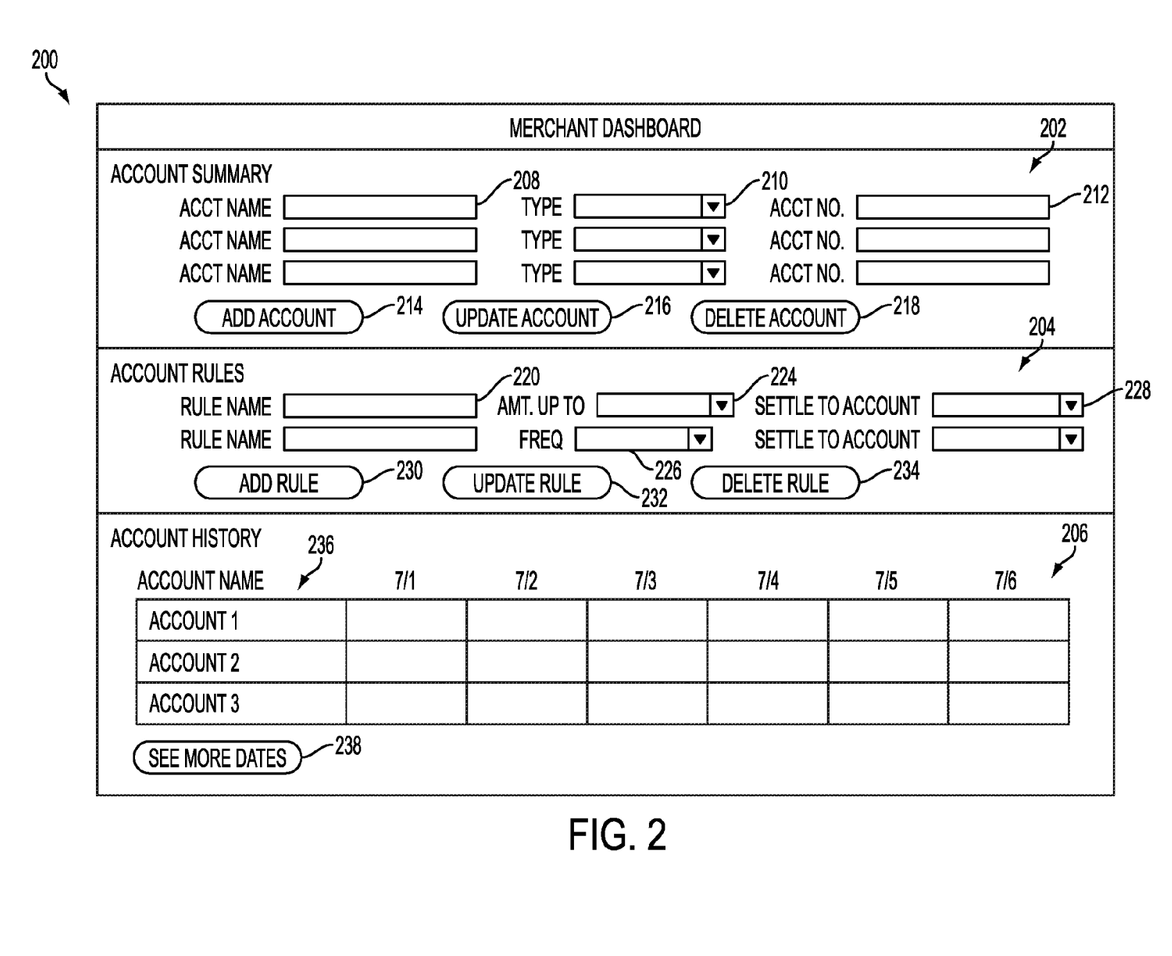
FIG. 2 depicts an example interface showing a merchant dashboard displayed on a computing device through which a merchant can interact with an acquirer processor.

FIG. 2 is an example interface showing a merchant dashboard 200 display on a computing device through which a merchant can interact with an acquirer processor. Referring to FIGS. 1-2, the merchant dashboard 200 can be presented to the merchant 104 on the display screen of the merchant computing device 160. The merchant dashboard 200 can be accessed via a computer, smartphone, tablet computer, or any other suitable communication device. In some embodiments, the merchant dashboard 200 is hosted by the acquirer processor 108, or affiliate thereof, and accessed by the merchant 104 through a web browser or application interface. As is to be appreciated, access to the merchant dashboard 200 can be regulated by suitable techniques, such as username/password combinations, tokens, rolling password codes, and so forth. Different levels of access or permissions available to a user can also be user-dependent. For example, different users associated with a merchant can each have a different username/password or otherwise differing log-in credentials. The features available to the user, or even the information that is displayed to the user, can depend on which particular user logs into the merchant dashboard 200. Additionally, data received through the merchant dashboard 200 that is transmitted to the acquirer processor 108 through network communications (such as network communication 142, FIG. 1) can be encrypted, or otherwise secured, during transmission.

The illustrated embodiment of the merchant dashboard 200 has multiple portions, including an account summary portion 202, an account rules portion 204, and an account history portion 206. Other embodiments can convey this information, or other relevant information, to the merchant using different displays without departing from the scope of the present disclosure. For example, some embodiments can utilize tabbed pages, pop-up windows, or any other presentation techniques. Furthermore, the merchant dashboard 200 can be customized or optimized to be viewed on different types of computing devices. For example, a merchant dashboard 200 to be displayed on the screen of a smart phone can be formatted differently than a merchant dashboard 200 to be displayed on a laptop computer.

Through interactions with the account summary portion 202, the merchant 104 can link various accounts (Accounts 1-n) to the acquirer processor 108. The merchant 104 can enter an account name in name field 208 and an account type can be entered in type field 210. In some embodiments, the type field is a drop-down box that displays a variety of account types from which the merchant can choose (savings, checking, prepaid account, and so forth). An account identifier, such as an account number, can be provided by the merchant in account number field 212. In some embodiments, the account type selected in the type field 210 can determine which types of account identifiers are needed by the acquirer processor. For example, if the merchant 104 indicates that a particular account is a checking account, the merchant dashboard 200 can display a first field for receiving a routing number and a second field for receiving an account number. As is to be appreciated, other types of accounts may require other types of information from the merchant 104. In any event, the merchant 104 links a desired number of accounts using the account summary portion 202. The merchant dashboard 200 can provide various functionality for account management. Activation of an add account graphical button 214, for example, can allow the merchant to add information regarding an additional financial account. Activation of an update account button 216, for example, can allow the merchant to alter information for an existing linked financial account, such as change an account number or an address associated with the account. Activation of a delete account button 218, for example, can delete an account from the list of linked accounts.

Through interactions with the account rules portion 204, the merchant 104 can establish the settlement rules or guidelines associated with the one or more linked accounts. In one embodiment, using a name field 220, the merchant 104 can supply a name or other identifier for a particular rule. The account rules portion 204 can provide a variety of options or directives that can be associated with the rule. For example, a maximum amount to be settled can be entered in amount field 224. A particular linked account can then be identified in account field 228. The account field 228 can be a drop-down box that presents all of the accounts listed in the summary portion 202. The rules established by the merchant 104 can be stored in the rules database 112 and used by the settlement engine 116 during settlement. Other options can be additionally or alternatively selected, such as a frequency field 226, for example. Examples of other options that can be associated with a rule are transfer type, maximum amount to transfer over a time period, and so forth. The merchant dashboard 200 can also provide various functionality for rule management or maintenance. Activation of an add rule graphical button 230, for example, can allow the merchant to add a new rule. Activation of an update rule button 232, for example, can allow the merchant to alter information for an existing rule, such as change the frequency or maximum transfer amount. Activation of a delete rule button 234, for example, can delete or a rule from the list of rules.

The merchant dashboard 200 can also display other account related information to the merchant 104. The account history portion 206 in the illustrated embodiment, for example, shows the amount settled to each account over a period of time. The accounts listed in the accounts name column 236 can be the names provided by the merchant 104 in the name field 208 in the account summary portion 202. The merchant dashboard 200 can provide various functionality for account history management. Activation of a graphical button 238, for example, can allow the merchant to view settlements that have occurred on various dates. As is to be appreciated, the account history portion 206 can display information in any suitable format, such as bar graphs, pie charts, and so forth.

FIG. 3 shows an example settlement flow of funds from an acquirer processor to three different accounts linked to a merchant. In accordance with the systems and methods described herein, rules are associated with the accounts to control the settlement process. In the illustrated embodiment, Account 1 is to receive $500 every five days, Account 2 is to receive a maximum of $700, and Account 3 is to receive any remaining funds. Each of the accounts shown in FIG. 3 can be of any suitable type, such as a checking account, savings account, pre-paid open-loop account, virtual wallet account, peer-to-peer account, pre-paid closed-loop account, investment account, loan account, money market account, credit union account, or any other type of account capable of receiving funds. The funds in the pooled account can be the result of processing one or more transactions on behalf of the merchant. Referring first to row 302, the end of day balance in the pooled account for Day 1 is $1200. The rule associated with Account 1 provides that $500 is to be received every five days. Accordingly, a $500 portion of the $1200 is settled to Account 1, as shown. The rule associated with Account 2 provides that a maximum settlement amount of $700 can be deposited into Account 2. Accordingly, the remaining $700 is settled into Account 2. It is noted that the particular fund transfer technique used to settle the funds (intrabank transfer, ACH transfer, etc.) may be dependent on the type of account the funds are being settled. In instances where an account can receive funds through multiple transfer methods, a rule (or at least a default setting) can determine the transfer technique that is utilized for a particular settlement event.

Referring now to row 304 of FIG. 3, the end of day balance for Day 2 is $700. Since Account 1 is only to receive funds every five days, that account does not receive any funds on Day 2. As noted above, the rule associated with Account 2 provides that a maximum settlement amount of $700 can be deposited into Account 2. Accordingly, the entire $700 is settled into Account 2.

Referring now to row 306 of FIG. 3, the end of day balance for Day 3 is $2400. Since Account 1 is only to receive funds every five days, that account does not receive any funds on Day 3. As noted above, the rule associated with Account 2 provides that a maximum settlement amount of $700 can be deposited into Account 2. Accordingly, the $700 is settled into Account 2. The rule associated with Account 3 provides that any remaining funds are to be deposited into Account 3. As shown, the remaining $1700 is deposited into Account 3.

Referring now to row 308 of FIG. 3, the end of day balance for Day 4 is $600. Again, since Account 1 is only to receive funds every five days, that account does not receive any funds. The entire $600 is settled into Account 2, in accordance with the settlement rules.

Referring now to row 310 of FIG. 3, the end of day balance for Day 5 is $1300. Since Account 1 is only to receive funds every five days, that account does not receive any funds on Day 5. First, $700 of the $1300 is transferred into Account 2. The remaining $600 is deposited into Account 3, in accordance with the settlement rules.

Referring finally to row 312 of FIG. 3, the end of day balance for Day 6 is $600. Since five days has passed since the original transfer to Account 1, $500 of the $600 is transferred to Account 1. As shown, the remaining $100 is transferred to Account 2

Figure 4:
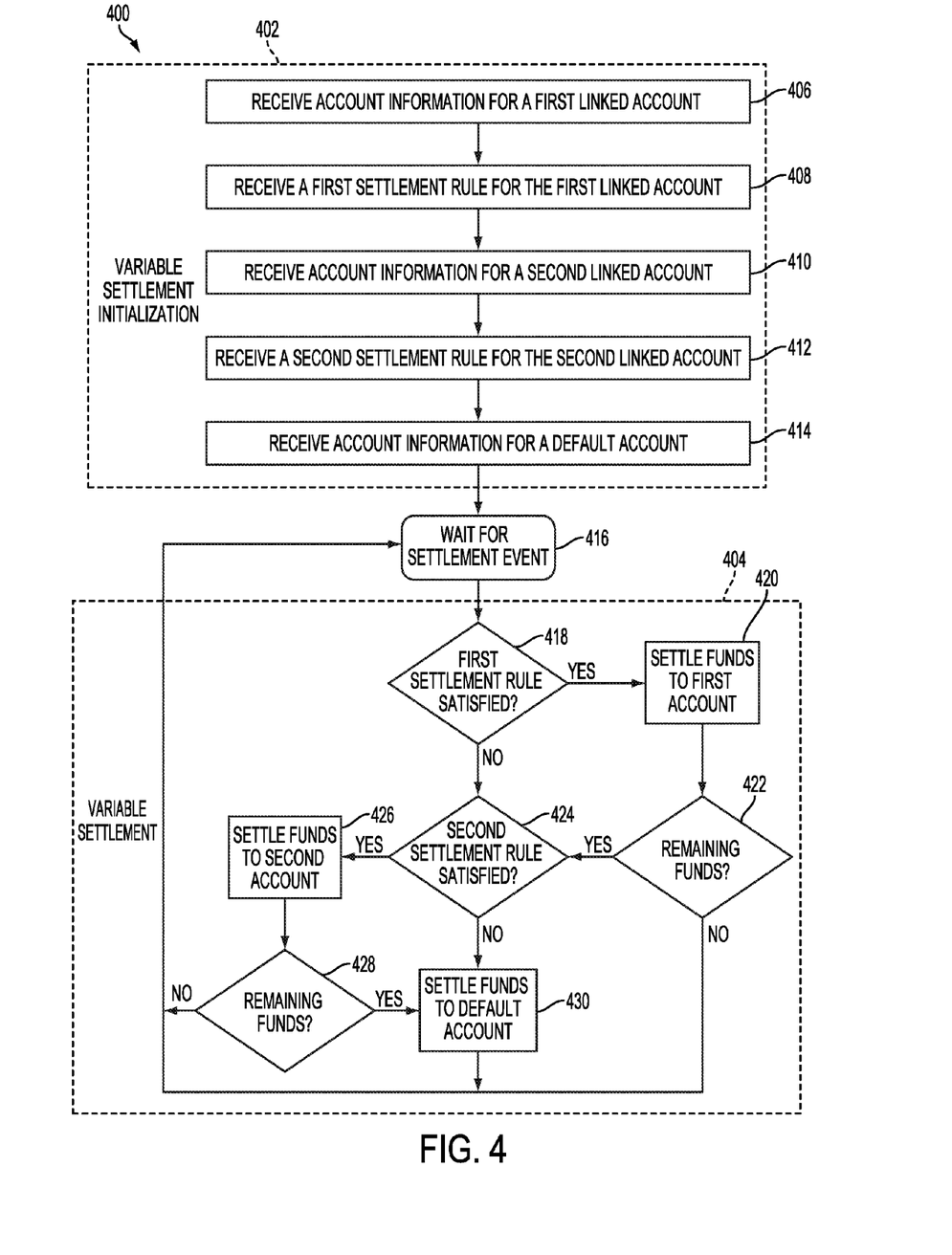
FIG. 4 depicts a merchant directed variable settlement process in accordance with one non-limiting embodiment.

FIG. 4 illustrates a merchant directed variable settlement process 400 in accordance with one non-limiting embodiment. The merchant directed variable settlement process 400 can be executed, at least in part, by the acquirer processor 108 (FIG. 1). The process generally includes two portions, a variable settlement initiation portion 402 and a variable settlement portion 404. During the variable settlement initiation portion 402 a merchant can link accounts, define rules, or otherwise regulate or control the settlement process. This information can be received via the merchant interface 110 (FIG. 1), for example. In the illustrated example, at 406, account information is received for a first linked account. At 408, a first settlement rule is received that is associated with the first linked account. The details of this rule can be stored in the rules database (FIG. 1). At 410, account information is received for a second linked account. At 412, a second settlement rule is received that is associated with the second linked account. It is noted that in some embodiments, various rules may be associated with more than one account. In the illustrated embodiment, at 414, account information identifying a default account is received. The default account can be, for example, one of the first or second linked accounts, or separate account.

Once the merchant has linked the desired number and types of accounts, at 416, the system (i.e., the settlement engine 116) waits for a settlement event. The settlement event can occur daily or at any other suitable interval. During the settlement event, the variable settlement process 404 can be implemented. At 418, it is determined if the first settlement rule is satisfied. The first settlement rule can include any type of criteria, such as a particular settlement amount, a settlement frequency, and so forth. If the first settlement rule is satisfied, funds from a pooled account 114 (FIG. 1) are settled to the first linked account at 420. Depending on how the first settlement rule is structured, there may still be funds in the pooled account that were not settled to the first account. At 422, it is determined if there are remaining funds in the pooled account. If there are remaining funds, the process, at 424, determines if the second rule is satisfied. If there are no remaining funds, the process returns to 416 to wait for the next settlement event. Referring again to 424, if the second settlement rule is satisfied, funds are settled to the second account at 426. At 428, it is determined if there are remaining funds in the pooled account. If there are remaining funds, the process, at 430, settles the funds to the default account. If there are no remaining funds, the process returns to 416 to wait for the next settlement event. It can be seen the example process shown in FIG. 4 that if neither the first settlement rule nor the second settlement rule are satisfied, all of the funds are settled to the default account 430. In some embodiments, contingencies can be established to handle certain events. For example, if an error in funding a certain account is experienced (due to an error in the account number, for example), the funds can be retained in the pooled account 114. In other embodiments, a particular account or collection of accounts can be designed to receive all funds that are not transferable to the originally designated account.

Figure 5:
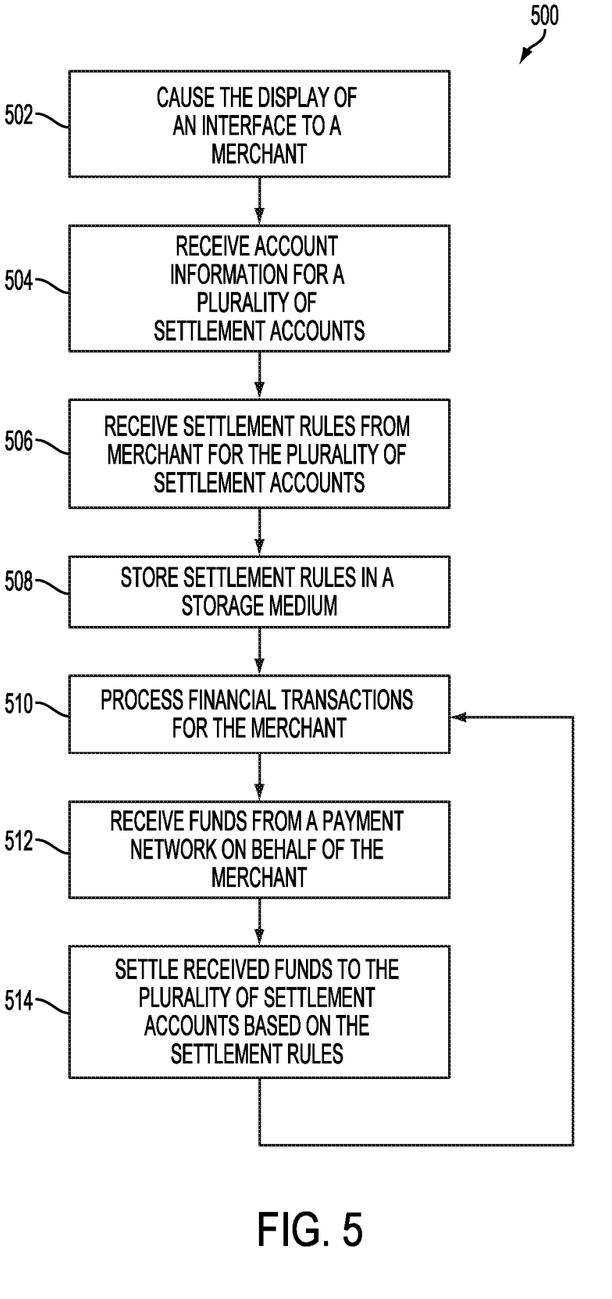
FIG. 5 depicts a merchant directed variable settlement process in accordance with another non-limiting embodiment.

FIG. 5 illustrates a merchant directed variable settlement process 500 in accordance with one non-limiting embodiment. At 502, an acquirer processor, or other affiliated provider or host, causes the display of an interface to a merchant. The display can be presented via a web browser, for example. At 504, account information is received for a plurality of settlement accounts. Such account information can be provided through input to the interface. At 506, settlement rules are received from the merchant for the plurality of settlement accounts. The particular structure of format of the rules may vary based on the merchant interacting with the system. Some rules may relate to a plurality of accounts (i.e., "evenly divide pooled account across Account A, Account B, and Account C") and other rules may relate to only a single account (i.e., "transfer a maximum of $15,000 to Account D"). Some rules may be conditional (i.e., "if at least $200 has been settled to Account A, then settle $200 to Account B) or even time based (i.e., "only settle funds to Account A on Fridays"). In any event, at 508, the settlement rules are stored in a storage medium. At 510, financial transactions are processed for the merchant. At 512, funds are electronically received from the payment network on behalf of the merchant. The funds may be temporality stored in a pooled account. At 514, the received funds are settled to the plurality of settlement accounts based on the settlement rules, and perhaps, less any applicable fees. As shown, in FIG. 5, the process can return to processing financial transactions for the merchant.

Figure 6:
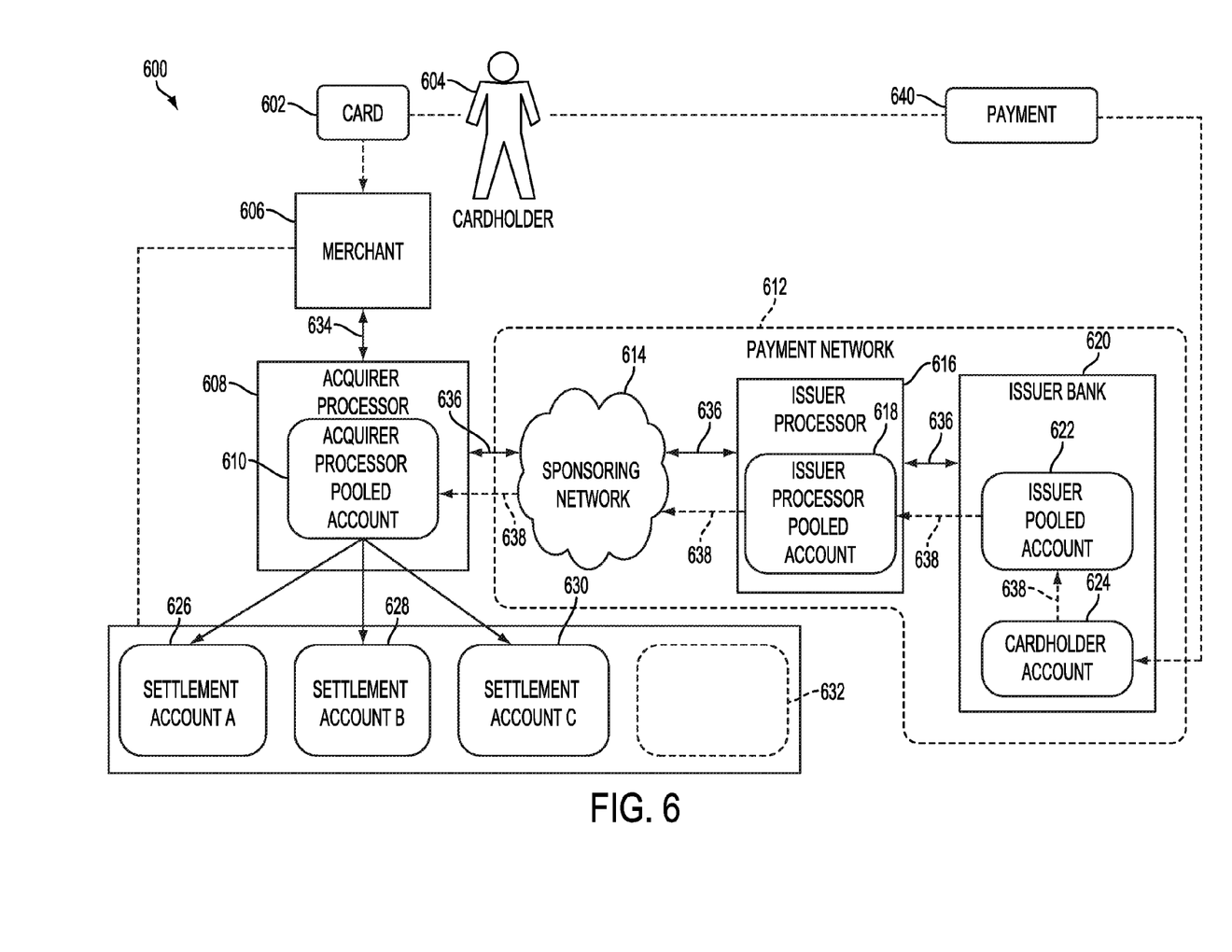
FIG. 6 depicts an example of the various entities that are involved with financial cards and that process financial card transactions.

FIG. 6 is a block diagram 600 that illustrates an example of the various entities that are involved with financial cards and that process card transactions. The block diagram 600 includes a merchant 606, an acquirer processor 608 and a payment network 612. The payment network 612 can include various entities or functionalities, such as a sponsoring network 614, an issuer processor 616, and an issuer bank 620. The sponsoring network 614 can be an business, corporation, jointly owned corporation, or other entity that administers, promotes, and markets certain brands of cards. Exemplary associations include MasterCard International, Incorporated, and Visa U.S.A., Inc. The issuer bank 620 is typically a financial institution or an agent of a financial institution that has issued a financial card 602 to a cardholder 604. The issuer bank 620 can maintain an issuer pooled account 622. The issuer processor 616 can process financial transactions on behalf of the issuer bank 620 and maintain an issuer processor pooled account 618. It is noted that depending on the financial card 602 used by the cardholder 604 and the merchant 604, the acquirer processor 608 and the issuer processor 616 may be the same entity for a particular transaction. The cardholder 604 can be an individual, a business, or other entity. The cardholder 604 receives a card from the issuer 620 and the name of the cardholder 604 is usually embossed on the card. The issuer bank 620 maintains a cardholder account 624 that reflects the status of the card given to the cardholder 604. A debit card, for example, is often associated with a checking account of the cardholder 604 while a credit card may be associated with a line of credit that has been extended to the cardholder 604 by the issuer bank 620. The acquirer processor 608 can be a financial institution that maintains a relationship with the merchant 606. In accordance with the systems and methods described herein, the merchant 606 can establish or link a plurality of settlement accounts 626, 628, 630, 632 to the acquirer processor 608.

Generally, the acquirer 608 receives card transactions from the merchant 606, as indicated by communication 634. Through messages 636 sent and received through the payment network 612, the card transaction associated with the use of the financial card 602 at the merchant 606 can be authorized or denied. Funds associated with an authorized transaction can be deposited in an acquirer processor pooled account 610. These funds can be cleared and settled from this account (less any settlement fees or other processing fees) to the settlement accounts 626, 628, 630, 632. The settlement of funds to these accounts can be based on settlement rules previously established by the merchant 606.

In the case of credit transactions, subsequent to the transaction with the merchant 606, the cardholder 604 can make a payment 640 to the issuer bank 620 and the issuer bank 620 can provide funds to the associated entities, as illustrated by fund flows 638.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for a transitory, propagating signals.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A computer-based funds transfer system for settling accounts according to merchant-controlled settlement rules, comprising:
   a web server or application server of an acquirer processor system configured to:
      generate a merchant dashboard graphical user interface (GUI) for enabling merchants to input settlement rules for settling funds from an acquirer processor pooled account to merchant accounts; and
      direct a remote computing device of a merchant to electronically generate and present an instance of the merchant dashboard GUI on a display of the remote computing device, wherein the instance of the merchant dashboard GUI comprises:
         a settlement rules portion comprising an amount field and a target account field; and
         an account identification field;
      receive via the merchant input of the account identification field of the merchant dashboard GUI, one or more merchant accounts; and
      receive, via the merchant input of the settlement rules portion of the merchant dashboard GUI, one or more settlement rules for the merchant, the one or more received settlement rules each comprising an amount entered into the amount field of the settlement rules portion and at least one target account entered into the target account field of the settlement rules portion, wherein the at least one target account is one or more of the received one or more merchant accounts, and wherein the one or more settlement rules provide one or more directives for optionally settling funds from an acquirer processor pooled account to at least one of the received one or more merchant accounts;
   an electronic rules database of the acquirer processor system connected to the web server or application server of the acquirer processor system, the electronic rules database storing the one or more received settlement rules for the merchant; and
   a settlement engine of the acquirer processor system connected to the electronic rules database of the acquirer processor system, the settlement engine configured to:
      receive a payment authorization request from a point of system device for a transaction;
      communicate the payment authorization to the payment network to seek authorization for the transaction;
      receive an electronic transfer of funds into the acquirer processor pooled account on behalf of the merchant subsequent to execution of a payment vehicle transaction at a point of sale device of the merchant based on the authorization granted by the payment network;
      upon receipt of the electronic transfer of funds into the acquirer processor pooled account on behalf of the merchant, retrieve the settlement rules received for the merchant from the electronic rules database; and
      based on the one or more settlement rules retrieved for the merchant, electronically transfer funds from the acquirer processor pooled account to the at least one of the received one or more merchant accounts according to the retrieved settlement rules, wherein the retrieved settlement rules define one or more funds transfer technique(s) to electronically transfer funds from the acquirer processor pooled account to the one or more merchant accounts, and wherein the electronic transfer of funds is a substantially instantaneous transfer of funds to the one or more merchant account(s) using an intra-bank transfer technique, wherein the acquirer processor pooled account retains the funds if an error in funding one or more merchant account(s) is experienced.

2. The computer-based funds transfer system of claim 1, wherein the web server or application server of the acquirer processor system is configured to receive a plurality of settlement rules for the merchant.

3. The computer-based funds transfer system of claim 1, wherein the settlement rules portion of the generated instance of the merchant dashboard GUI further comprises one or more of a rule revision option and a rule deletion option.

4. The computer-based funds transfer system of claim 1, wherein the instance of the merchant dashboard GUI further comprises one or more of an account revision option and an account deletion option.

5. The computer-based funds transfer system of claim 1, wherein the received one or more settlement rules specifies one or more electronic fund transfer methods for electronically transferring funds to the at least one of the received one or more merchant accounts.

6. The computer-based funds transfer system of claim 1, wherein the one or more received settlement rules identifies a plurality of received merchant accounts.

7. The computer-based funds transfer system of claim 6, wherein the plurality of received merchant accounts comprises a first financial account and a second financial account.

8. The computer-based funds transfer system of claim 7, wherein the first financial account is of a first account type and the second financial account is of a second account type.

9. The computer-based funds transfer system of claim 7, wherein the first financial account is accessible by a first account holder and the second financial account is accessible by a second account holder, wherein the first account holder is different than the second account holder.

10. The computer-based funds transfer system of claim 6, wherein the plurality of received merchant accounts are each of an account type, wherein the account type is any of a checking account, a savings account, a pre-paid open-loop account, a virtual wallet account, a peer-to-peer account, a pre-paid closed-loop account, an investment account, a loan account, and a money market account.

11. A system comprising:
one or more processors of an acquirer processor system, configured to:
receive one or more settlement rules for a merchant through at least one input in one or more of the amount field and the target account field, wherein the one or more settlement rules provide one or more directives for settling funds from the acquirer processor pooled account to the plurality of merchant financial accounts;
an electronic rules database of the acquirer processor system connected to the one or more processors of the acquirer processor system, the electronic rules database storing the one or more received settlement rules for the merchant; and
a settlement engine of the acquirer processor system connected to the electronic rules database of the acquirer processor system, the settlement engine configured to:
receive a payment authorization request from a point of system device for a transaction;
communicate the payment authorization to the payment network to seek authorization for the transaction;
receive an electronic transfer of funds into the acquirer processor pooled account on behalf of the merchant subsequent to execution of a payment vehicle transaction at a point of sale device of the merchant based on the authorization granted by the payment network;
upon receipt of the electronic transfer of funds into the acquirer processor pooled account on behalf of the merchant, access the electronic rules database to retrieve the one or more settlement rules received in relation to the merchant; and
based on the one or more settlement rules retrieved for the merchant from the electronic rules database, electronically transfer a first portion of funds to one of the plurality of merchant financial accounts according to the retrieved settlement rules, and electronically transfer a second portion of funds to another of the plurality of merchant financial accounts according to the retrieved settlement rules, wherein the retrieved settlement rules define one or more funds transfer technique(s) to electronically transfer funds from the acquirer processor pooled account to the one or more merchant accounts, wherein the electronic transfer of the first portion of funds is a substantially instantaneous transfer of funds to the one or more merchant account(s) using an intra-bank transfer technique, wherein the acquirer processor pooled account retains the funds if an error in funding one or more merchant accounts is experienced.

12. The system of claim 11, wherein the one or more settlement rules specifies a percentage of funds to electronically transfer from the acquirer processor account to at least one of the plurality of merchant financial accounts.

13. The system of claim 11, wherein the one or more settlement rules specifies one or more electronic fund transfer methods for electronically transferring funds to at least one of the plurality of merchant financial accounts.

14. The system of claim 11, wherein a first merchant financial account of the plurality of merchant financial accounts is held by a first account holder and a second merchant financial account of the plurality of merchant financial accounts is held by a second account holder, wherein the first account holder is different than the second account holder.

15. The system of claim 11, wherein the plurality of merchant financial accounts are each of an account type, wherein the account type is any of a checking account, a savings account, a pre-paid open-loop account, a virtual wallet account, a peer-to-peer account, a pre-paid closed-loop account, an investment account, a loan account, and a money market account.

* * * * *